(12) United States Patent
Wang et al.

(10) Patent No.: US 8,456,961 B1
(45) Date of Patent: Jun. 4, 2013

(54) SYSTEMS AND METHODS FOR MOUNTING AND ALIGNING A LASER IN AN ELECTRICALLY ASSISTED MAGNETIC RECORDING ASSEMBLY

(75) Inventors: Lei Wang, Fremont, CA (US); Jih-Chiou Hser, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/053,466

(22) Filed: Mar. 22, 2011

(51) Int. Cl.
*G11B 11/00* (2006.01)

(52) U.S. Cl.
USPC .................................................... 369/13.01

(58) Field of Classification Search
None
See application file for complete search history.

(56) References Cited

U.S. PATENT DOCUMENTS

| | | | |
|---|---|---|---|
| 5,687,267 A | 11/1997 | Uchida | |
| 5,907,571 A | 5/1999 | Ogino et al. | |
| 6,164,837 A | 12/2000 | Haake et al. | |
| 6,485,198 B1 | 11/2002 | Chang et al. | |
| 6,534,794 B1 | 3/2003 | Nakanishi et al. | |
| 6,577,656 B2 | 6/2003 | Chen et al. | |
| 6,858,871 B2 | 2/2005 | Okada | |
| 7,217,955 B2 | 5/2007 | Hamaoka et al. | |
| 7,371,017 B1 | 5/2008 | Shi et al. | |
| 7,449,905 B2 | 11/2008 | Shi et al. | |
| 7,502,397 B2 | 3/2009 | Naganuma | |
| 7,522,649 B2 | 4/2009 | Ha et al. | |
| 7,608,863 B2 | 10/2009 | Oda et al. | |
| 7,613,080 B2 | 11/2009 | Oozeki et al. | |
| 7,739,703 B2 | 6/2010 | Arai et al. | |
| 2002/0089913 A1 | 7/2002 | Moriyama et al. | |
| 2002/0163865 A1 | 11/2002 | Zimmer et al. | |
| 2003/0002549 A1 | 1/2003 | Oh | |
| 2007/0015313 A1 | 1/2007 | Kwak et al. | |
| 2008/0056073 A1 | 3/2008 | Shimizu | |
| 2008/0316872 A1 | 12/2008 | Shimizu et al. | |
| 2010/0238581 A1* | 9/2010 | Nakamura et al. | 360/59 |
| 2011/0141862 A1* | 6/2011 | Arai et al. | 369/13.33 |
| 2011/0242697 A1* | 10/2011 | Mori et al. | 360/59 |
| 2012/0147717 A1* | 6/2012 | Shimazawa et al. | 369/13.33 |
| 2012/0163137 A1* | 6/2012 | Wang et al. | 369/13.02 |

* cited by examiner

*Primary Examiner* — Adam R Giesy
*Assistant Examiner* — Henok Heyi

(57) ABSTRACT

Systems and methods for mounting and aligning a laser in an electrically assisted magnetic recording (EAMR) assembly are described. In one embodiment, the invention relates to a submount assembly for a laser diode of an EAMR head, the submount assembly including a submount including a block shape including a first surface including a plurality of first conductive pads and a second surface including a second conductive pad, a laser including a main emitter and at least one alignment emitter, the laser having a block shape having a first surface including a plurality of first conductive pads attached to the first pads of the submount, and a slider including a top surface having a conductive pad configured to be attached to the second pad of the submount, wherein the at least one alignment emitter is configured to align the laser and the slider for attachment.

10 Claims, 6 Drawing Sheets

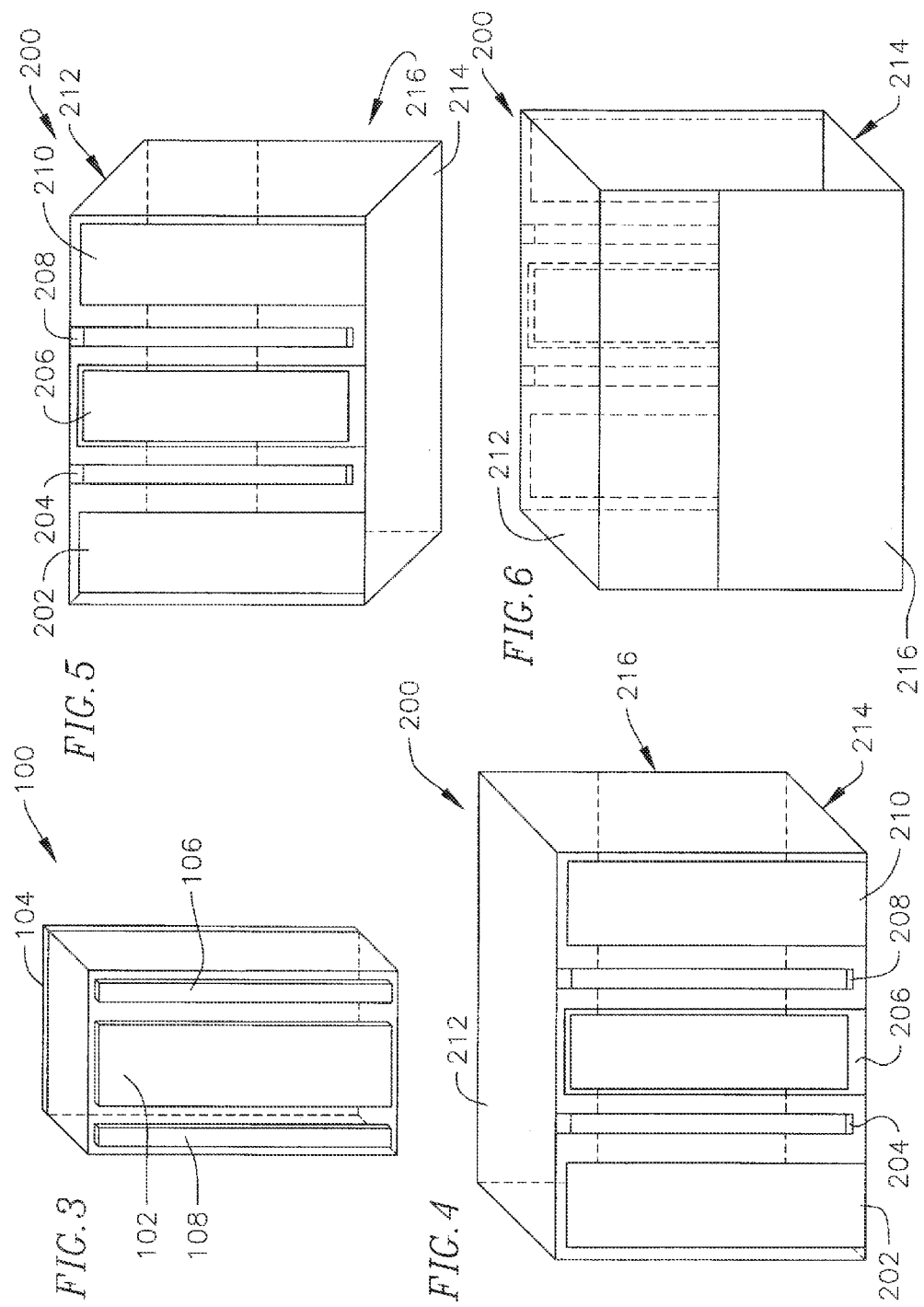

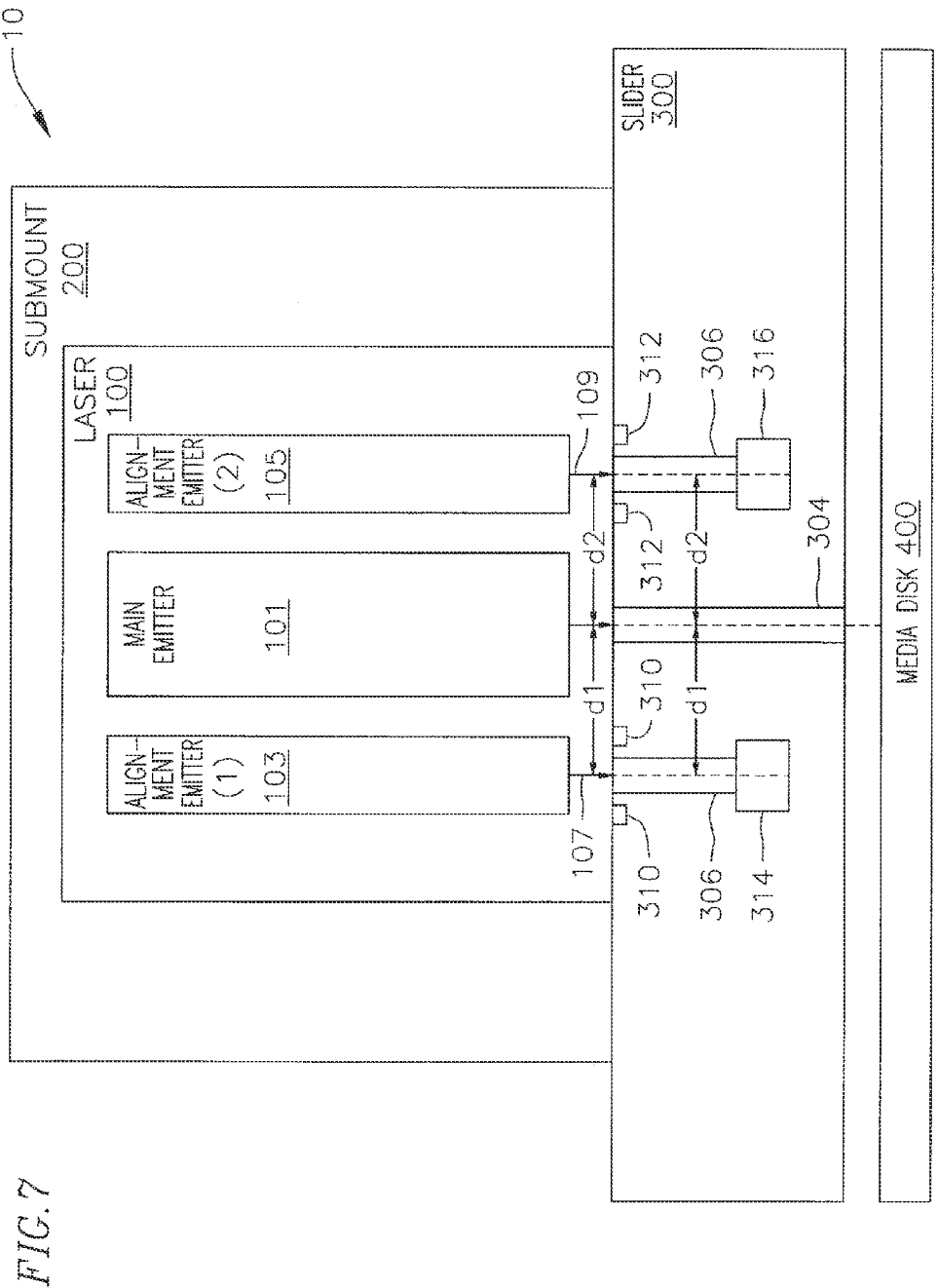

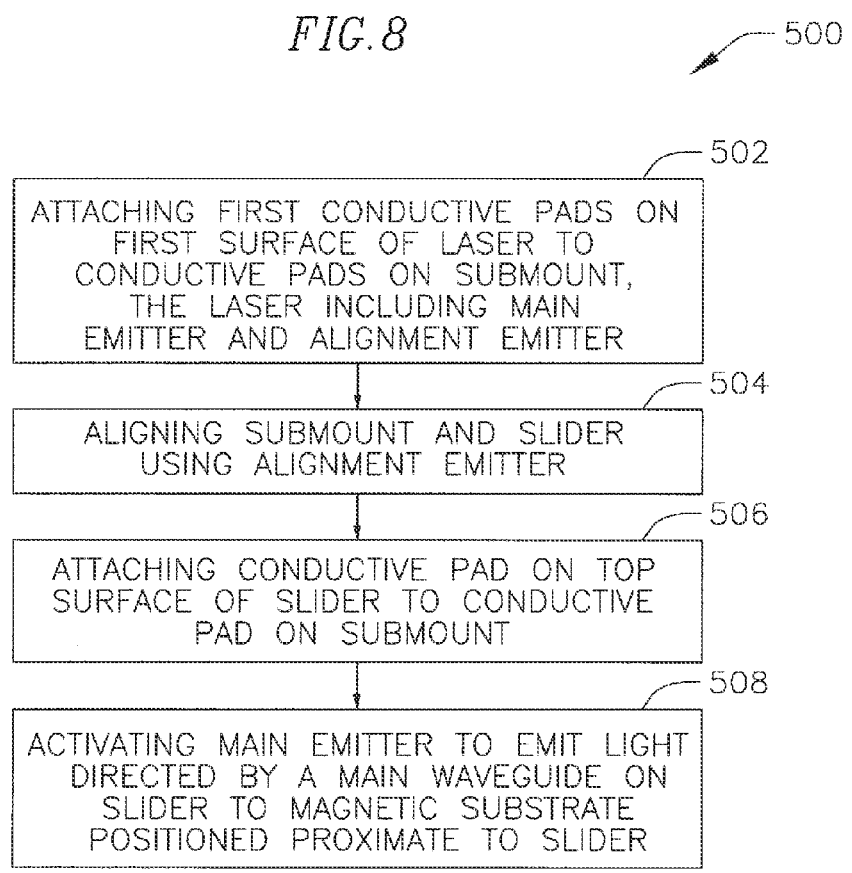

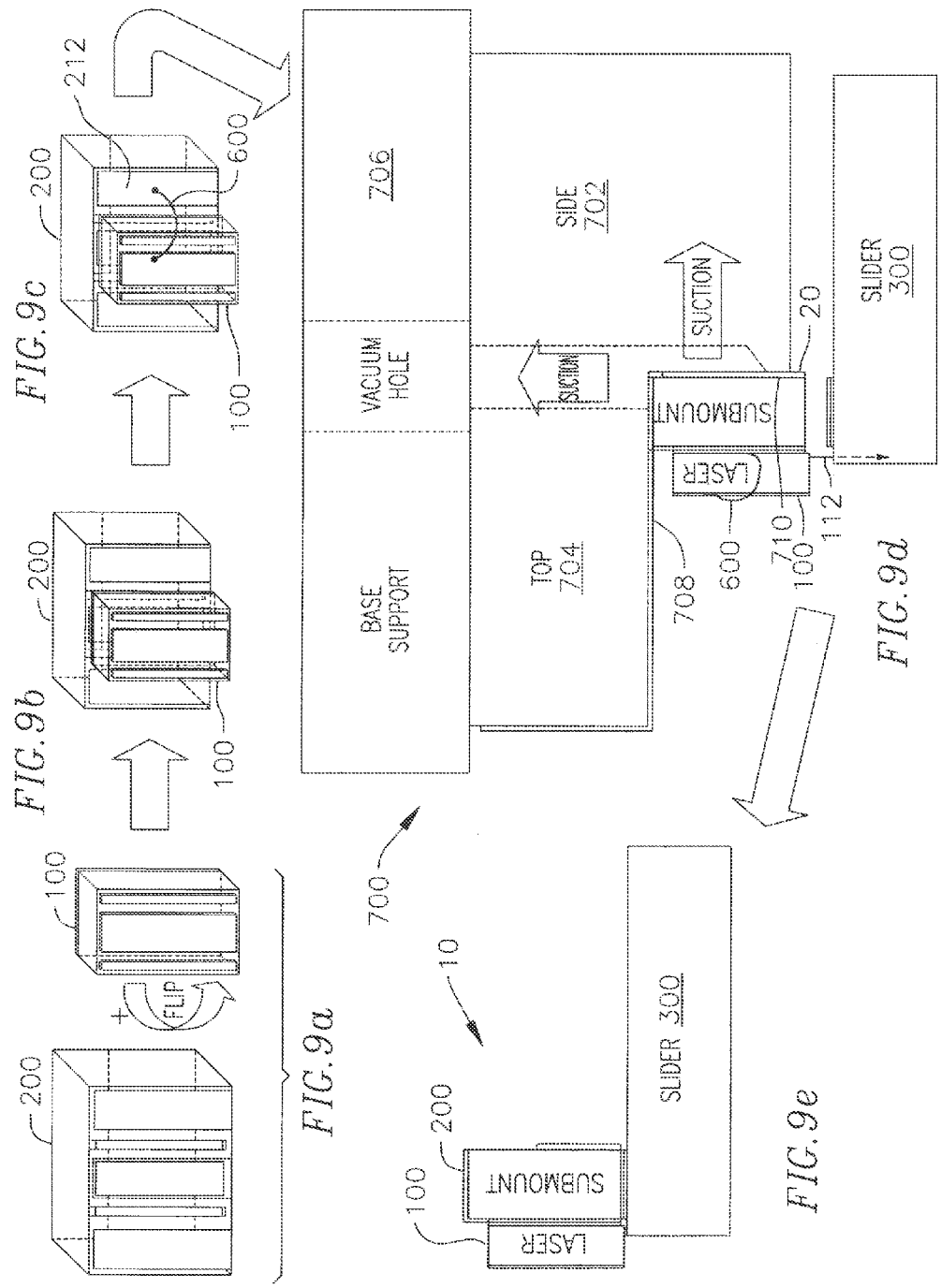

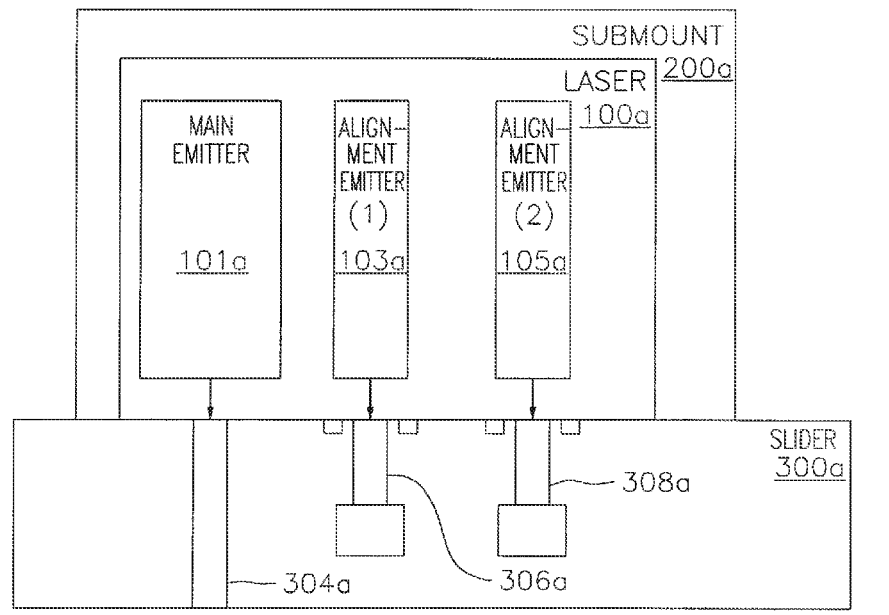
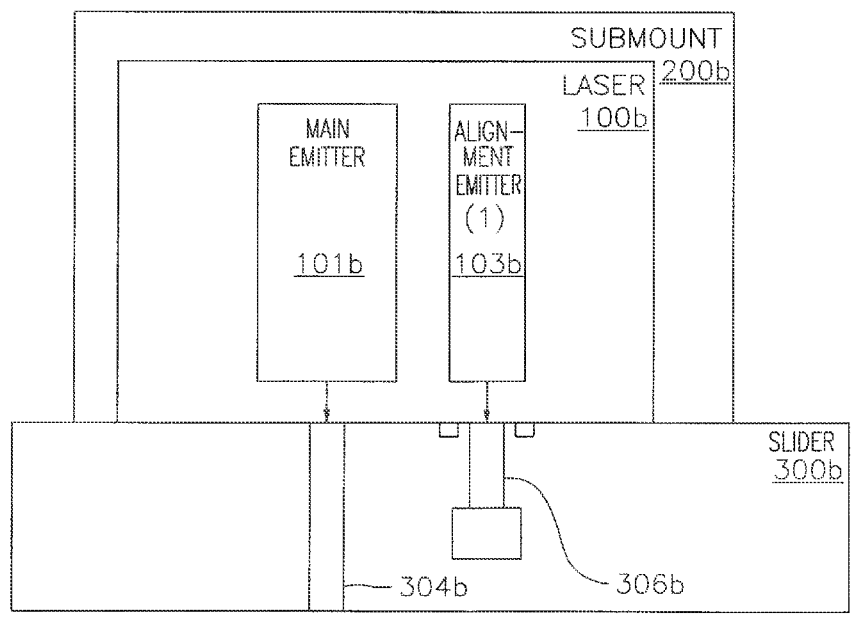

SYSTEMS AND METHODS FOR MOUNTING AND ALIGNING A LASER IN AN ELECTRICALLY ASSISTED MAGNETIC RECORDING ASSEMBLY

FIELD

The present invention relates to information storage devices, and more specifically to systems and methods for mounting and aligning a laser in an electrically assisted magnetic recording (EAMR) assembly.

BACKGROUND

Conventional electrically assisted magnetic recording (EAMR) disk drives generally include an EAMR assembly including a conventional laser diode (e.g., laser) mounted to a submount which is coupled to a slider that can be suspended over a recording media disk. The submount is helpful to dissipate excess thermal energy from the laser and to provide connectivity for electrical signals to the laser.

Light from the laser is directed by a transducer positioned within the slider to a region of the media disk thereby heating the region. The transducer can then magnetically write information to the media in the region that was heated. As precise control and delivery of the laser light to the media can be important, EAMR systems generally require accurate alignment of the laser and slider during the assembly process. However, the alignment and assembly of the components of the conventional EAMR systems can be complicated and challenging. Accordingly, what is needed is a system and method for improving the alignment and assembly processes associated with EAMR assemblies.

SUMMARY

Aspects of the invention relate to systems and methods for mounting and aligning a laser in an electrically assisted magnetic recording (EAMR) assembly. In one embodiment, the invention relates to a submount assembly for a laser diode of an EAMR head, the submount assembly including a submount including a block shape including a first surface including a plurality of first conductive pads and a second surface including a second conductive pad, a laser including a main emitter and at least one alignment emitter, the laser having a block shape having a first surface including a plurality of first conductive pads attached to the first pads of the submount, and a slider including a top surface having a conductive pad configured to be attached to the second pad of the submount, wherein the at least one alignment emitter is configured to align the laser and the slider for attachment.

In another embodiment, the invention relates to a method for assembling an energy assisted magnetic recording (EAMR) head, the method including attaching a plurality of first conductive pads on a first surface of a laser to a plurality of conductive pads on a submount, the laser including a main emitter and at least one alignment emitter, aligning the laser and a slider using the at least one alignment emitter, attaching a conductive pad on a top surface of the slider to one of the plurality of conductive pads on the submount, activating the main emitter to emit light directed by a main waveguide on the slider to a magnetic substrate positioned proximate to the slider.

BRIEF DESCRIPTION OF THE DRAWINGS

FIG. 3 is a rear perspective view of the multi-emitter laser of FIG. 1 illustrating the arrangement of pads on a back side surface in accordance with one embodiment of the invention.

FIG. 4 is a top perspective view of the submount of FIG. 1 illustrating the arrangement of pads on a front side surface and top surface in accordance with one embodiment of the invention.

FIG. 5 is a bottom perspective view of the submount of FIG. 1 illustrating the arrangement of pads on the front side surface and a bottom surface in accordance with one embodiment of the invention.

FIG. 6 is a rear perspective view of the submount of FIG. 1 illustrating the arrangement of pads on a back side surface and the top surface in accordance with one embodiment of the invention.

FIG. 7 is a cross sectional block diagram of the EAMR assembly and the media disk of FIG. 2 taken along the line of the laser beam extending through the slider, illustrating the arrangement of a main emitter, a first alignment emitter, and a second alignment emitter of the laser and a main waveguide, a first alignment waveguide, and a second alignment waveguide of the slider in accordance with one embodiment of the invention.

FIG. 8 is a flow chart of a process for assembling an EAMR assembly including a multi-emitter laser, a submount, and a slider in accordance with one embodiment of the invention.

FIGS. 9*a*-9*e* illustrate multiple perspective and side views of an EAMR assembly, including a multi-emitter laser, a submount, and a slider, in a process for assembling the EAMR assembly in accordance with one embodiment of the invention.

FIG. 10 is a cross sectional block diagram of an EAMR assembly illustrating an alternative arrangement of a main emitter, a first alignment emitter, and a second alignment emitter of the laser and a main waveguide, a first alignment waveguide, and a second alignment waveguide of the slider in accordance with one embodiment of the invention.

FIG. 11 is a cross sectional block diagram of an EAMR assembly illustrating another alternative arrangement of a main emitter and a single alignment emitter of the laser and a main waveguide and a single alignment waveguide of the slider in accordance with one embodiment of the invention.

DETAILED DESCRIPTION

Figure 1:
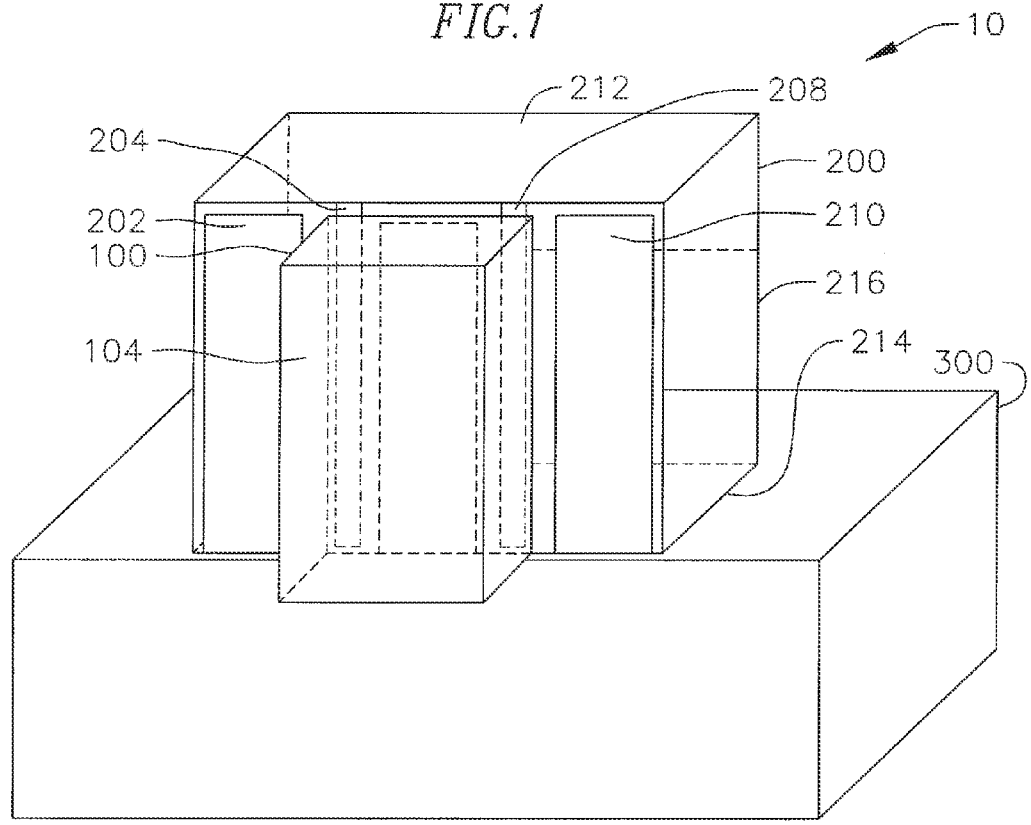
FIG. 1 is a perspective view of an electrically assisted magnetic recording (EAMR) assembly including a multi-emitter laser attached to a submount which is mounted on top of a slider in accordance with one embodiment of the invention.

Referring now to the drawings, embodiments of systems and methods for mounting and aligning a laser in an electrically assisted magnetic recording (EAMR) assembly are illustrated. The laser includes both a main emitter for writing information to a magnetic media disk and at least one alignment emitter for aligning the laser with a slider before the laser is coupled with the slider. The laser is attached to a submount prior to alignment with and attachment to the slider. The submount includes a number of conductive pads configured to enable electrical connectivity to the laser and separate control of the main emitter and alignment emitter.

In several embodiments, the submount is picked up and retained using a gripper device configured to apply vacuum pressure to the submount. As the submount is retained by the vacuum pressure, electrodes on the gripper make conductive contact with pads on the submount that are coupled to the alignment emitter. In such case, the gripper can be used to apply a voltage to the alignment emitter and thereby facilitate alignment and attachment of the laser and slider. Once the laser and slider are properly aligned, the submount can be attached to the slider. In several embodiments, the submount is attached to the slider by soldering appropriate pad(s) on each component.

In one embodiment, a process for assembling the components of the EAMR assembly includes attaching pads of a laser, where the laser includes a main emitter and an alignment emitter, to corresponding pads of the submount, aligning the laser and a slider using the alignment emitter, attaching a pad of the submount to a pad on the slider, activating the main emitter to emit light to a magnetic media substrate proximate the slider.

In several embodiments, the lasers and submounts described herein enable separate control/energization of the main emitter and alignment emitters under various circumstances, including testing, assembly, and operation.

FIG. 1 is a perspective view of an electrically assisted magnetic recording (EAMR) assembly 10 including a multi-emitter laser 100 attached to a submount 200 which is mounted on top of a slider 300 in accordance with one embodiment of the invention. The multi-emitter laser 100 has a rectangular block shape and includes a main laser diode 101 (not visible in FIG. 1 but see FIG. 7) positioned in a central section of the block shape and having a p-type electrode coupled to a center pad 102 on a rear side surface (not visible in FIG. 1 but see FIG. 3) of the laser block 100 and a n-type electrode coupled to a common pad 104 (e.g., common to both the main laser diode and alignment diodes) on a front side surface of the laser block 100.

The multi-emitter laser 100 also includes two alignment emitter diodes (103, 105) (not visible in FIG. 1 but see FIG. 7) positioned at outer sections of the rectangular block shape. The two alignment emitter diodes (103, 105) have p-type electrodes coupled to a first pad 106 and a second pad 108 on the rear side surface (not visible in FIG. 1 but see FIG. 3) of the laser block 100 and an n-type electrode coupled to the common pad 104 on the front side surface of the laser block 100. The main emitter 101 can be used to write information to a magnetic media disk and the alignment emitters (103, 105) can be used to align the laser 100 and the slider 300 before attaching the laser 100 and submount 200 to the slider 300.

The submount 200 has a rectangular block shape and includes five pads (202, 204, 206, 208, 210) positioned on a front side surface (pad 206 is not visible in FIG. 1 but see FIGS. 3 and 5) of the submount 200. Pads 204, 206, and 208 on the first side surface of the submount are configured to attach to, and are soldered to, corresponding pads 106, 102 and 108 of the laser 100. The submount 200 also includes a pad 212 on a top surface, a pad 214 on a bottom surface, and a pad 216 on a rear side surface (pads 214 and 216 are not visible in FIG. 1 but see FIGS. 3, 5, and 6). Top surface pad 212 is electrically connected to pad 204 and pad 208 of the front side surface of the submount 200. Bottom surface pad 214 is electrically connected to pad 202, pad 206, and pad 210 on the front side surface. Rear side surface pad 216 is electrically connected to bottom surface pad 214, and therefore also to pad 202, pad 206, and pad 210 on the front side surface. The pads of the submount 200 not attached to the laser 100 or slider 300 can be used during an alignment phase as described below.

The slider 300 includes a single pad 302 on a top surface (not visible in FIG. 1 but see FIG. 2) configured to attach to, and soldered to, pad 214 on the bottom surface of the submount 200. The slider 300 also includes a main waveguide 304 and two alignment waveguides (306, 308) (waveguides are not visible in FIG. 1 or 2 but see FIG. 7).

FIGS. 1-6 illustrate pad arrangements on both the laser 100 and submount 200 to support two alignment emitters. In other embodiments, the number of pads can be reduced to support a single alignment emitter, or increased to support more than two alignment emitters. In such case, the other components needed to support the numbers of alignment emitters can be adjusted accordingly. In several embodiments, the laser includes a single main emitter for writing information to the media disk. In other embodiments, the laser can include additional main emitters for writing information to one or more media disks.

In one embodiment, the laser 100 has a thickness (e.g., horizontal dimension along bottom edge in FIG. 2) of about 80 to 100 microns, a height (e.g., vertical dimension along side edge in FIG. 2) of about 200 to 1000 microns, and a width of about 200 microns. In other embodiments, the laser can have other suitable dimensions. In one embodiment, the laser provides about 60 milliwatts. In other embodiments, the laser can provide more than or less than 60 milliwatts.

In one embodiment, the submount 200 has a thickness (e.g., horizontal dimension along bottom edge in FIG. 2) of about 140 to 220 microns, a height (e.g., vertical dimension along side edge in FIG. 2) of about 250 to 1050 microns, and a width of about 400 to 700 microns. In other embodiments, the submount can have other suitable dimensions. In several embodiments, the height of the submount is made to be just greater than the height of the laser.

In one embodiment, the slider 300 has a thickness (e.g., vertical dimension along side edge in FIG. 2) of about 200 to 250 microns, a length (e.g., horizontal dimension along bottom edge in FIG. 2) of about 800 to 1300 microns, and a width of about 600 to 800 microns. In other embodiments, the slider can have other suitable dimensions.

Figure 2:
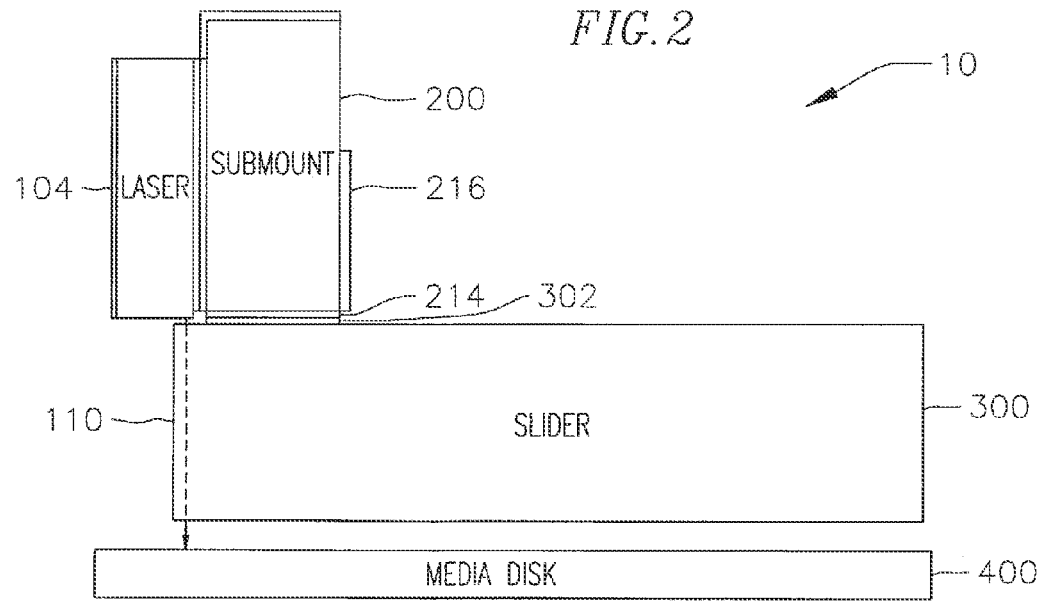
FIG. 2 is a side view of the electrically assisted magnetic recording (EAMR) assembly of FIG. 1 positioned over a media disk in accordance with one embodiment of the invention.

FIG. 2 is a side view of the electrically assisted magnetic recording (EAMR) assembly 10 of FIG. 1 positioned over a media disk 400 in accordance with one embodiment of the invention. In operation, the main emitter 101 (see FIG. 7) of the laser 100 can be activated to produce light beam 110 that extends through main waveguide 304 (see FIG. 7) of the slider 300 and on to the media disk 400. In one embodiment, the main emitter 101 is activated by applying a first voltage to pad 102 of the laser 100, via pad 302 of the slider 300, and a second voltage to pad 104 of the laser 100 by an external connection (not shown) thereto.

FIG. 3 is a rear perspective view of the multi-emitter laser 100 of FIG. 1 illustrating the arrangement of pads on a back side surface (102, 106, 108) in accordance with one embodiment of the invention. Pad 104 of the laser is positioned on the front side surface.

FIG. 4 is a top perspective view of the submount 200 of FIG. 1 illustrating the arrangement of pads on a front side surface (202, 204, 206, 208, 210) and top surface (212) in accordance with one embodiment of the invention.

FIG. 5 is a bottom perspective view of the submount 200 of FIG. 1 illustrating the arrangement of pads on the front side surface (202, 204, 206, 208, 210) and a bottom surface (214) in accordance with one embodiment of the invention.

FIG. 6 is a rear perspective view of the submount 200 of FIG. 1 illustrating the arrangement of pads on a back side surface (216) and the top surface (212) in accordance with one embodiment of the invention.

FIG. 7 is a cross sectional block diagram of the EAMR assembly 10 and the media disk 400 of FIG. 2 taken along the line of the laser beam 110 extending through the slider 300, illustrating the arrangement of a main emitter 101, a first alignment emitter 103, and a second alignment emitter 105 of the laser 100 and a main waveguide 304, a first alignment waveguide 306, and a second alignment waveguide 308 of the slider 300 in accordance with one embodiment of the invention.

The slider 300 includes first fiducial marks 310 and second fiducial marks 312 for passive alignment that can precede active alignment using the alignment emitters (103, 105). The slider 300 also includes a first output device 314 positioned at an end of the first waveguide 306, and a second output device 316 positioned at an end of the second waveguide 308. The output devices (314, 316) can be used to measure and maximize a quantity of light received from the alignment emitters (103, 105) during an alignment process. The alignment emitters (103, 105) are spaced apart from the main emitter 101 by distances d1 and d2, respectively. Similarly, waveguides (306, 308) are spaced apart from the main waveguide 304 by the distances d1 and d2, respectively. The precise spacing in both the laser emitters and submount waveguides can contribute to proper and accurate alignment.

In operation, the submount 200 and attached laser 100 are initially separated from the slider 300 by some distance. Passive alignment of the laser 100 and slider 300 can be accomplished by roughly aligning the alignment emitters (103, 105) and the fiducial marks (310, 312) of the slider. The alignment emitters (103, 105) can be activated. Thus, the first alignment emitter 103 can emit a light beam 107 and first alignment emitter 103 can thus emit a light beam 109. Light beam 107 can be received by first waveguide 306 and the first output device 314. Similarly, light beam 109 can be received by second waveguide 308 and the first output device 316. Output devices (314, 316) can measure and maximize the received light for accurate alignment of the laser 100 and slider 300. Additional details regarding the alignment and assembly processes are described below.

FIG. 8 is a flow chart of a process 500 for assembling an EAMR assembly including a multi-emitter laser, a submount, and a slider in accordance with one embodiment of the invention. The process first attaches (502) first conductive pads on a first surface of the laser to conductive pads on the submount. In several embodiments, three pads on the first surface of the laser are attached to three corresponding pads on a surface of the submount by soldering the pads together. In other embodiments, more than or less than three pads on the first surface of the laser are attached to corresponding pads on a surface of the submount. In some embodiments, a flip chip bonder and a camera are used to facilitate the alignment and soldering of the pads of the laser and submount. In one embodiment, the flip chip bonder is a model FC300 made by SET or Smart Equipment Technology of Saint Jeoire, France. In some embodiments, a jumper wire, or another suitable connector, is soldered to a pad on the laser and a pad on the submount to facilitate operation of the alignment emitters and non-operation of the main emitter. In such case, the arrangement of pads on the submount and laser can enable independent control of the main emitter and alignment emitters.

The process then aligns (504) the submount and the slider using one or more alignment emitters. In several embodiments, the submount is picked up and retained using a gripper device configured to apply vacuum pressure to the submount. As the submount is retained, voltage can be applied to electrodes on the gripper having made conductive contact with pads on the submount. As such, the electrodes are effectively coupled to the one or more alignment emitters. Alignment waveguides and output devices/optical detectors on the slider help to determine when the laser/submount assembly is properly aligned with the slider.

The process then attaches (506) a conductive pad on the top surface (e.g., pad 302 in FIG. 2) of the slider to a corresponding conductive pad (e.g., pad 214 in FIG. 2). In several embodiments, the attachment is achieved by soldering. In embodiments having installed the jumper wire, the jumper wire can be removed or otherwise disconnected following the attachment. The process then activates (508) the main emitter to emit light directed by the main waveguide on the slider to a magnetic substrate (e.g., magnetic media disk) positioned proximate to the slider (e.g., beneath the slider). In several embodiments, the bottom surface of the slider is an air bearing surface (ABS) and the magnetic substrate is positioned just below the ABS. In a number of embodiments, the main emitter is activated by application of a voltage across the appropriate pads of the laser and submount that are coupled to the terminals of the main emitter.

In one embodiment, the process can perform the sequence of actions in a different order. In another embodiment, the process can skip one or more of the actions. In other embodiments, one or more of the actions are performed simultaneously. In some embodiments, additional actions can be performed.

A similar alignment process in described in U.S. patent application No. 12/976,770, filed Dec. 22, 2010, entitled, "METHOD AND SYSTEM FOR OPTICALLY COUPLING A LASER WITH A TRANSDUCER IN AN ENERGY ASSISTED MAGNETIC RECORDING DISK DRIVE", the entire content of which is incorporated herein by reference.

FIGS. 9a-9e illustrate multiple perspective and side views of an EAMR assembly, including a multi-emitter laser 100, a submount 200, and a slider 300, in a process for assembling the EAMR assembly in accordance with one embodiment of the invention.

FIG. 9a is a perspective view of the laser 100 and submount 200 prior to attachment in accordance with one embodiment of the invention.

FIG. 9b is a perspective view of the laser 100 and submount 200 after attachment in accordance with one embodiment of the invention. In one embodiment, the attached laser 100 and submount 200 can be referred to as a chip on a submount assembly or COSA.

FIG. 9c is a perspective view of the attached laser 100 and submount 200 after a jumper wire 600 has been attached to pad 104 on the front side surface of the laser 100 and pad 210 of the front side surface of the submount 200 in accordance with one embodiment of the invention. In another embodiment, the jumper wire 600 can be attached to pad 202 rather than pad 210. In one embodiment, the jumper wire is replaced by another suitable connector. In another embodiment, other suitable arrangements of pads and jumpers can be used to facilitate separate control of the alignment emitters during the alignment and assembly processes.

FIG. 9d is a side view of a gripper assembly 700 retaining the submount 200 and the laser 100 above a slider 300 using vacuum pressure and applying an alignment voltage to the alignment emitters of the laser 100 in accordance with one embodiment of the invention. The gripper assembly 700 includes a side section 702 and a top section 704 for contacting and applying the vacuum pressure to sides of the submount 200 in two directions. The gripper assembly 700 can be thought of as being a silicon gripper and having an L-shaped body. The contacting surfaces of the side section 702 and the top section 704 each have openings (e.g., holes) at which the vacuum pressure is applied via a base support 706 positioned above the two sections. The contacting surface of the top section 704 also includes a positive electrode 708 for applying a voltage to the positive or p-type electrodes of the alignment emitters of the laser 100. The contacting surface of the side section 702 also includes a negative electrode 710 for applying a voltage to the negative or n-type electrode of the alignment emitters of the laser 100.

In operation, the gripper assembly 700 is positioned near the submount 200 and the vacuum pressure applied. Due to the force of the vacuum pressure and/or movement of the gripper assembly 700 or the submount 200, the submount 200 is positioned against the contacting walls and corresponding electrodes (708, 710) of the side section 702 and top section 704. Once the electrodes (708, 710) have made contact with corresponding pads of the submount 200, which are coupled to terminals of the alignment emitters, and appropriate voltages applied thereto, the alignment emitters are activated and emit light 112 into the slider 300. Using alignment waveguides and output detectors/devices in the slider 300 (see FIG. 7), correct alignment of the laser 100 and slider 300 can be achieved by ensuring that a preselected amount of light is received at each of the alignment waveguides. Once the correct alignment is achieved, the positions of the slider 300 and submount 200 can be substantially fixed in all directions except in the vertical or "z" direction. Solder can be placed on either the bottom pad of the submount 200 or on the pad on the top surface of the slider 300. The submount 200 and/or slider 300 can be brought together as the pads are heated for a proper solder junction. Once attachment of the submount 200 and slider 300 is complete, the jumper wire 600 can be removed.

FIG. 9e is a side view of the completed electrically assisted magnetic recording (EAMR) assembly 10 in accordance with one embodiment of the invention. In several embodiments, a voltage is applied to the main emitter of the laser 100 by applying a positive terminal voltage to the pad on the slider 300 and a negative terminal voltage to the pad 104 of the laser.

In one embodiment, the process can perform the sequence of actions illustrated in FIGS. 9a-9e in a different order. In another embodiment, the process can skip one or more of the actions. In other embodiments, one or more of the actions are performed simultaneously. In some embodiments, additional actions can be performed.

In one embodiment, the submount 200 is made of aluminum nitride or another suitable material. In one embodiment, the conductive pads are made of titanium, platinum and/or gold. In other embodiments, the conductive pads are made of other suitable conductive materials. In one embodiment, the solder is made of a gold tin alloy. In other embodiments, the solder is made of other suitable materials.

In one embodiment, the laser 100 is made of gallium arsenide and/or other suitable materials such as aluminum or indium. In one embodiment, the gripper 700 is made of silicon. In other embodiments, the gripper 700 is made of other materials having suitable thermal expansion properties. In one embodiment, the gripper 700 is made of tungsten carbide, copper, steel, and/or other suitable materials.

FIG. 10 is a cross sectional block diagram of an EAMR assembly 10a illustrating an alternative arrangement of a main emitter 101a, a first alignment emitter 103a, and a second alignment emitter 105a of the laser 100a and a main waveguide 304a, a first alignment waveguide 306a, and a second alignment waveguide 308a of the slider 300a in accordance with one embodiment of the invention. In this arrangement, the alignment emitters (103a, 105a) of the laser 100a are both positioned along the same side section of the laser 100a rather than on opposite sides of the main emitter (see e.g., FIG. 7). Similar to the embodiment of FIG. 7, laser 100a is attached to submount 200a which is mounted to slider 300a.

FIG. 11 is a cross sectional block diagram of an EAMR assembly 10b illustrating another alternative arrangement of a main emitter 10b and a single alignment emitter 103b of the laser 100b and a main waveguide 304b and a single alignment waveguide 306b of the slider 300b in accordance with one embodiment of the invention. In this arrangement, a single alignment emitter 103b of the laser 100b is positioned to one side of the laser 100b, opposite of the main emitter 10 lb, rather than having two alignment emitters where each is positioned on opposite sides of the main emitter (see e.g., FIG. 7). Similar to the embodiment of FIG. 7, laser 100b is attached to submount 200b which is mounted to slider 300b.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A submount assembly for a laser diode of an energy assisted magnetic recording (EAMR) head, the submount assembly comprising:
    a submount comprising a block shape comprising a first surface including a plurality of first conductive pads and a second surface comprising a second conductive pad;
    a laser comprising a main emitter and at least one alignment emitter, the laser having a block shape having a first surface comprising a plurality of first conductive pads attached to the first pads of the submount; and
    a slider comprising a top surface having a conductive pad configured to be attached to the second pad of the submount,
    wherein the at least one alignment emitter is configured to align the laser and the slider for attachment.

2. The submount assembly of claim 1:
    wherein the slider further comprises a main waveguide for guiding light to a magnetic substrate positioned proximate to the slider, and
    wherein the main emitter is configured to emit light to the main waveguide.

3. The submount assembly of claim 2, wherein the slider further comprises an alignment waveguide configured to receive light from the at least one alignment emitter during an alignment and attachment phase.

4. The submount assembly of claim 3:
    wherein the alignment waveguide and the main waveguide are spaced apart by a preselected distance, and
    wherein the main emitter and the at least one alignment emitter are spaced apart by the preselected distance.

5. The submount assembly of claim 1, wherein the slider comprises a magnetic read head configured to read or write data on a magnetic substrate positioned proximate to the slider.

6. The submount assembly of claim 1, wherein the laser comprises two alignment emitters.

7. The submount assembly of claim 6:
    wherein the plurality of first conductive pads on the first surface of the submount comprises four first conductive pads,
    wherein a primary two of the four first conductive pads on the first surface of the submount are electrically coupled to the second conductive pad on the second surface of the submount, wherein the submount further comprises a third conductive pad on a third surface of the submount opposite to the second surface, wherein a secondary two of the four first conductive pads on the first surface of the submount are electrically coupled to the third conductive pad on the third surface of the submount, and wherein the submount further comprises a fourth conductive pad on a fourth surface of the submount opposite to the first surface, the fourth conductive pad electrically coupled to the second conductive pad on the second surface of the submount.

8. The submount assembly of claim 7:

wherein the plurality of first conductive pads on the first surface of the laser comprise three first conductive pads attached to three of the four first conductive pads on the first surface of the submount, and wherein the laser further comprises a second conductive pad on a second surface of the laser opposite to the first surface of the laser.

9. The submount assembly of claim 8, further comprising:

a gripper comprising:

a first gripper surface including a first electrode configured to make electrical contact with the third pad on the third surface of the submount;

a second gripper surface including a second electrode configured to make electrical contact with the fourth pad on the fourth surface of the submount; and a hole along either or both of the first gripper surface and the second gripper surface, wherein the gripper is configured to apply a vacuum pressure via the hole for retaining the submount in conductive contact with the first gripper surface and the second gripper surface during an alignment and attachment phase, and wherein the gripper is configured to apply a first voltage at the first electrode and a second voltage at the second electrode to activate the alignment emitters.

10. The submount assembly of claim 8, further comprising a jumper wire coupled to the second conductive pad on the second surface of the laser and to the one of the four first conductive pads on the first surface of the submount not attached to the laser, wherein the jumper wire is installed during an alignment and attachment phase and removed thereafter.

\* \* \* \* \*